(12) United States Patent
Ritchford et al.

(10) Patent No.: US 8,055,674 B2
(45) Date of Patent: Nov. 8, 2011

(54) ANNOTATION FRAMEWORK

(75) Inventors: Tom Ritchford, Brooklyn, NY (US); Jonathan Betz, Summit, NJ (US)

(73) Assignee: Google Inc., Mountain View, CA (US)

( * ) Notice: Subject to any disclaimer, the term of this patent is extended or adjusted under 35 U.S.C. 154(b) by 296 days.

(21) Appl. No.: 11/356,728

(22) Filed: Feb. 17, 2006

(65) Prior Publication Data
US 2007/0198499 A1   Aug. 23, 2007

(51) Int. Cl.
*G06F 7/00* (2006.01)
*G06F 17/30* (2006.01)
(52) U.S. Cl. ........................ 707/769; 707/738
(58) Field of Classification Search ............... 707/3, 769
See application file for complete search history.

(56) References Cited

U.S. PATENT DOCUMENTS

| | | | | |
|---|---|---|---|---|
| 4,888,690 A | 12/1989 | Huber | | 364/200 |
| 4,899,292 A | 2/1990 | Montagna et al. | | 364/521 |
| 5,475,819 A | 12/1995 | Miller et al. | | |
| 5,544,051 A | * 8/1996 | Senn et al. | | 707/3 |
| 5,560,005 A | 9/1996 | Hoover et al. | | |
| 5,574,898 A | 11/1996 | Leblang et al. | | |
| 5,778,378 A | 7/1998 | Rubin | | |
| 5,815,415 A | * 9/1998 | Bentley et al. | | 703/4 |
| 5,832,479 A | 11/1998 | Berkowitz et al. | | 707/3 |
| 5,870,739 A | * 2/1999 | Davis et al. | | 707/4 |
| 5,905,980 A | * 5/1999 | Masuichi et al. | | 707/700 |
| 5,946,692 A | 8/1999 | Faloutsos et al. | | 707/101 |
| 5,963,940 A | 10/1999 | Liddy et al. | | 707/5 |
| 6,006,221 A | 12/1999 | Liddy et al. | | 707/5 |
| 6,014,661 A | 1/2000 | Ahlberg et al. | | 707/3 |
| 6,026,388 A | 2/2000 | Liddy et al. | | 707/1 |
| 6,029,195 A | 2/2000 | Herz | | 709/219 |
| 6,101,515 A | 8/2000 | Wical et al. | | 707/531 |
| 6,105,020 A | 8/2000 | Lindsay et al. | | 707/2 |
| 6,105,030 A | 8/2000 | Syed et al. | | 707/10 |
| 6,216,138 B1 | 4/2001 | Wells et al. | | 707/502 |
| 6,222,540 B1 | 4/2001 | Sacerdoti | | 345/339 |
| 6,263,328 B1 | 7/2001 | Coden et al. | | |
| 6,263,335 B1 | 7/2001 | Paik et al. | | 707/5 |
| 6,304,864 B1 | 10/2001 | Liddy et al. | | 706/15 |
| 6,311,189 B1 | * 10/2001 | deVries et al. | | 707/102 |
| 6,326,962 B1 | 12/2001 | Szabo | | 345/348 |
| 6,327,574 B1 | 12/2001 | Kramer et al. | | |
| 6,363,179 B1 | 3/2002 | Evans et al. | | 382/309 |

(Continued)

FOREIGN PATENT DOCUMENTS

DE        10245900 A1    4/2004

(Continued)

OTHER PUBLICATIONS

PCT International Search Report and Written Opinion, PCT/US07/61156, Feb. 11, 2008, 7 pages.

(Continued)

*Primary Examiner* — Pierre Vital
*Assistant Examiner* — Sabana Rahman
(74) *Attorney, Agent, or Firm* — Morgan, Lewis & Bockius LLP

(57) ABSTRACT

A fact repository contains facts having attributes and values and further having associated annotations, which are used, among other things, to vet facts in the repository and which can be returned in response to a query.

52 Claims, 13 Drawing Sheets

U.S. PATENT DOCUMENTS

| | | | |
|---|---|---|---|
| 6,377,943 B1 | 4/2002 | Jakobsson | 707/2 |
| 6,480,194 B1 | 11/2002 | Sang'udi et al. | 345/440 |
| 6,519,631 B1 | 2/2003 | Rosenschein et al. | 709/217 |
| 6,529,900 B1 | 3/2003 | Patterson et al. | 707/3 |
| 6,584,464 B1 | 6/2003 | Warthen | 707/4 |
| 6,606,659 B1 | 8/2003 | Hegli et al. | |
| 6,609,123 B1 | 8/2003 | Cazemier et al. | |
| 6,629,097 B1 | 9/2003 | Keith | 707/5 |
| 6,643,641 B1 | 11/2003 | Snyder | 707/4 |
| 6,718,324 B2 | 4/2004 | Edlund et al. | 707/5 |
| 6,832,218 B1 | 12/2004 | Emens et al. | 707/3 |
| 6,850,896 B1 | 2/2005 | Kelman et al. | 705/10 |
| 6,873,982 B1 | 3/2005 | Bates et al. | 707/5 |
| 6,885,990 B1 | 4/2005 | Ohmori et al. | 704/270 |
| 6,928,436 B2 | 8/2005 | Baudel | 707/6 |
| 6,961,723 B2 | 11/2005 | Faybishenko et al. | 707/3 |
| 6,968,343 B2 | 11/2005 | Charisius et al. | 707/102 |
| 7,013,308 B1 | 3/2006 | Tunstall-Pedoe | 707/104.1 |
| 7,031,955 B1 | 4/2006 | de Souza et al. | 707/3 |
| 7,043,521 B2 | 5/2006 | Eitel | 709/202 |
| 7,100,083 B2 | 8/2006 | Little et al. | 714/26 |
| 7,146,538 B2* | 12/2006 | Johnson et al. | 714/30 |
| 7,158,983 B2 | 1/2007 | Willse et al. | 707/101 |
| 7,669,115 B2 | 2/2010 | Cho et al. | 715/212 |
| 2002/0055954 A1 | 5/2002 | Breuer | 707/507 |
| 2002/0065814 A1* | 5/2002 | Okamoto et al. | 707/3 |
| 2002/0065815 A1 | 5/2002 | Layden | 707/3 |
| 2002/0128818 A1 | 9/2002 | Ho et al. | 704/9 |
| 2002/0154175 A1 | 10/2002 | Abello et al. | 345/853 |
| 2002/0173984 A1 | 11/2002 | Robertson et al. | 705/1 |
| 2003/0005036 A1 | 1/2003 | Mitzenmacher | 709/203 |
| 2003/0069880 A1 | 4/2003 | Harrison et al. | 707/3 |
| 2003/0097357 A1* | 5/2003 | Ferrari et al. | 707/3 |
| 2003/0115485 A1 | 6/2003 | Milliken | 713/201 |
| 2003/0120373 A1 | 6/2003 | Eames | 700/128 |
| 2003/0120644 A1 | 6/2003 | Shirota | 707/3 |
| 2003/0120654 A1 | 6/2003 | Edlund et al. | 707/7 |
| 2003/0120659 A1 | 6/2003 | Sridhar | 707/100 |
| 2003/0154071 A1 | 8/2003 | Shreve | |
| 2003/0158855 A1 | 8/2003 | Farnham et al. | 707/102 |
| 2003/0195872 A1 | 10/2003 | Senn | 707/3 |
| 2003/0208665 A1 | 11/2003 | Peir et al. | 711/169 |
| 2003/0217052 A1 | 11/2003 | Rubenczyk et al. | 707/3 |
| 2004/0030731 A1 | 2/2004 | Iftode et al. | 707/205 |
| 2004/0107125 A1 | 6/2004 | Guheen et al. | |
| 2004/0122844 A1 | 6/2004 | Malloy et al. | |
| 2004/0125137 A1 | 7/2004 | Stata et al. | 345/764 |
| 2004/0167909 A1 | 8/2004 | Wakefield et al. | 707/100 |
| 2004/0220904 A1 | 11/2004 | Finlay et al. | 707/3 |
| 2004/0236655 A1 | 11/2004 | Scumniotales et al. | 705/36 |
| 2004/0255237 A1 | 12/2004 | Tong | 715/501.1 |
| 2004/0267700 A1 | 12/2004 | Dumais et al. | 707/2 |
| 2005/0022009 A1 | 1/2005 | Aguilera et al. | 713/201 |
| 2005/0033803 A1 | 2/2005 | Vleet et al. | 709/203 |
| 2005/0039033 A1 | 2/2005 | Meyers et al. | 713/193 |
| 2005/0050016 A1 | 3/2005 | Stanoi et al. | 707/3 |
| 2005/0055327 A1 | 3/2005 | Agrawal et al. | 707/1 |
| 2005/0057566 A1 | 3/2005 | Githens et al. | 345/440 |
| 2005/0060277 A1 | 3/2005 | Zlatanov et al. | 707/1 |
| 2005/0076012 A1 | 4/2005 | Manber et al. | |
| 2005/0083413 A1 | 4/2005 | Reed et al. | 348/211.99 |
| 2005/0086520 A1 | 4/2005 | Dharmapurikar et al. | 713/201 |
| 2005/0120004 A1 | 6/2005 | Stata et al. | 707/3 |
| 2005/0187898 A1 | 8/2005 | Chazelle et al. | 707/1 |
| 2005/0216464 A1 | 9/2005 | Toyama et al. | 707/9 |
| 2005/0219929 A1 | 10/2005 | Navas | 365/212 |
| 2005/0256825 A1 | 11/2005 | Dettinger et al. | |
| 2005/0268212 A1 | 12/2005 | Dagel | 715/500 |
| 2006/0004851 A1 | 1/2006 | Gold et al. | 707/103 X |
| 2006/0020582 A1 | 1/2006 | Dettinger et al. | 707/3 |
| 2006/0047838 A1 | 3/2006 | Chauhan | 709/230 |
| 2006/0085386 A1 | 4/2006 | Thanu et al. | 707/2 |
| 2006/0085465 A1 | 4/2006 | Nori et al. | |
| 2006/0149700 A1* | 7/2006 | Gladish et al. | 707/1 |
| 2006/0173824 A1 | 8/2006 | Bensky et al. | 707/3 |
| 2006/0206508 A1 | 9/2006 | Colace et al. | 707/100 |
| 2006/0224582 A1 | 10/2006 | Hogue | 707/6 |
| 2006/0253491 A1 | 11/2006 | Gokturk et al. | 707/104.1 |
| 2007/0022085 A1 | 1/2007 | Kulkarni | 707/1 |
| 2007/0055656 A1 | 3/2007 | Tunstall-Pedoe | 707/3 |
| 2007/0067108 A1 | 3/2007 | Buhler et al. | 702/19 |
| 2007/0179965 A1 | 8/2007 | Hogue et al. | 707/102 |
| 2007/0203867 A1 | 8/2007 | Hogue et al. | |
| 2007/0203868 A1 | 8/2007 | Betz | 706/50 |
| 2007/0271249 A1* | 11/2007 | Cragun et al. | 707/3 |
| 2008/0005064 A1* | 1/2008 | Sarukkai | 707/3 |
| 2008/0097958 A1* | 4/2008 | Ntoulas et al. | 707/2 |
| 2008/0209444 A1 | 8/2008 | Garrett et al. | 719/320 |
| 2008/0267504 A1 | 10/2008 | Schloter et al. | 382/181 |
| 2009/0100048 A1 | 4/2009 | Hull et al. | 707/5 |

FOREIGN PATENT DOCUMENTS

| | | | |
|---|---|---|---|
| WO | WO 00/49526 A1 | 8/2000 | |
| WO | WO 2004/114163 A2 | 12/2004 | |
| WO | WO 2008/097051 A1 | 8/2008 | |

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.

Brin, S., "Extracting Patterns and Relations from the World Wide Web," 12 pages.

Chang, C. et al., "IEPAD: Information Extraction Based on Pattern Discovery," WWW10 '01, ACM, May 1-5, 2001, pp. 681-688.

Chu-Carroll, J. et al., "A Multi-Strategy with Multi-Source Approach to Question Answering," 8 pages.

Dean, J. et al., "MapReduce: Simplified Data Processing on Large Clusters," To appear in OSDI 2004, pp. 1-13.

Etzioni, O. et al., "Web-scale Information Extraction in KnowItAll (Preliminary Results)," WWW2004, ACM, May 17-20, 2004, 11 pages.

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/Information_theory>.

Jones, R. et al., "Bootstrapping for Text Learning Tasks," 12 pages.

Kosseim, L, et al., "Answer Formulation for Question-Answering," 11 pages.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R. et al., "TextRank: Bringing Order into Texts," 8 pages.

PCT International Search Report and Written Opinion, PCT/US06/07639, Sep. 13, 2006, 6 pages.

Prager, J. et al., "IBM's PIQUANT in TREC2003," 10 pages.

Prager, J. et al., "Question Answering using Constraint Satisfaction: QA-by-Dossier-with-Constraints," 8 pages.

Ramakrishnan, G. et al., "Is Question Answering an Acquired Skill?", WWW2004, ACM, May 17, 2004, pp. 111-120.

Anagnostopoulos, *Information Fusion Meta-Search Interface for Precise Photo Acquisition on the Web*, 25th International Conference on Information Technology Interfaces, ITI 2003, Jun. 16-19, 2003, Cavtat, Croatia, pp. 375-381.

Anonymous, *Wie erstelle ich bei StudiVZ eine Bilder-Verlinkung?* (*How do I create an image with StudiVZ-linking?*), www.limillimil. de/wie-erstelle-ich-bei-studivz-eine-bilder-verlinkung-758.html, 2008, 10 pages.

Bharat, *Personalized, Interactive News on the Web*, Georgia Institute of Technology, Atlanta, GA, May 5, 1997, pp. 1-22.

*Bloom filter*, Wikipedia, en.wikipedia.org/wiki/Bloom_filter (last modified Feb. 13, 2005), pp. 1-4.

Bloom, *Space/Time Trade-offs in Hash Coding with Allowable Errors*, Communications of the ACM, vol. 13, No. 7, Jul. 1970, pp. 422-426.

Brin, *The Anatomy of a Large-Scale Hypertextual Web Search Engine*, 7th International World Wide Web Conference, Brisbane, Australia, Apr. 14-18, 1998, pp. 1-26.

Cao, *Bloom Filters—the math*, www.cs.wisc.edu/~cao/papers/summary-cache/node8.html, Jul. 5, 1998, pp. 1-6.

Castro, *iPhoto's new Faces feature really does work!*, www.pigsgourdandwikis.com/2009/02/iphotos-new-faces-geature-really-does.html, Feb. 17, 2009, 8 pages.

Chesnais, *The Fishwrap Personalized News System*, Community Networking, Integrated Multimedia Services to the Home, Proceedings of the Second International Workshop on, Jun. 20-22, 1995, pp. 275-282.

Clarke, *FrontPage 2002 Tutorials—Adding Functionality to your Website with FrontPage 2002 Part II—Navigation*, ABC—All 'Bout Computers, Apr. 2002, vol. 11, accessfp.net/fronpagenavigation.htm, 8 pages.

Cowie, *MOQA: Meaning-Oriented Question Answering*, Proceedings of RIAO 2004, 15 pages.

Ilyas, *Rank-Aware Query Optimization*, ACM SIGMOD 2004, Paris, France, Jun. 13-18, 2004, 12 pages.

International Search Report/Written Opinion, PCT/US07/061157, Feb. 15, 2008, 11 pages.

International Search Report/Written Opinion, PCT/US2006/010965, Jul. 5, 2006, 11 pages.

International Search Report/Written Opinion, PCT/US2007/061158, Feb. 28, 2008, 9 pages.

International Search Report/Written Opinion, PCT/US2010/044603, Nov. 17, 2010, 11 pages.

International Search Report/Written Opinion, PCT/US2010/044604, Oct. 6, 2010, 10 pages.

Kamba, *The Krakatoa Chronicle, An interactive, Personalized, Newspaper on the Web*, w3.ord/conferences/www4/papers/93, 1993, pp. 1-12.

Lin, *Question Answering from the Web Using Knowledge Annotation and Knowledge Mining Techniques*, CIKM'03, New Orleans, LA, Nov. 3-8, 2003, pp. 116-123.

Nyberg, *The JAVELIN Question-Answering System at TREC2003: A Multi Strategy Approach With Dynamic Planning*, TREC2003, Nov. 18-21, 2003, 9 pages.

Ogden, *Improving Cross-Language Text Retrieval with Human Interactions*, Proc. of the 33rd Hawaii International Conference on System Sciences, IEEE 2000, pp. 1-9.

*The MatLab, Using Matlab Graphics*, Version 5, MathWorks, Natick, MA, Dec. 1996, Part 1, 166 pages.

*The MatLab, Using Matlab Graphics*, Version 5, MathWorks, Natick, MA, Dec. 1996, Part 2, 165 pages.

Thompson, *Freshman Publishing Experiment Offers Made-to-Order Newspapers*, MIT News Office, http://web.mit.edu/newsoffice/1994/newspaper-0309.html, 1994, pp. 1-4.

\* cited by examiner

Example Format of Facts in Repository (each fact is associated with an object ID)

Example Facts in Repository (each
fact is associated with an object ID)

Example Object
Reference Table

Example Format of Facts in
Repository (each fact is associated
with an object ID)

Example Objects

Example Annotation Format

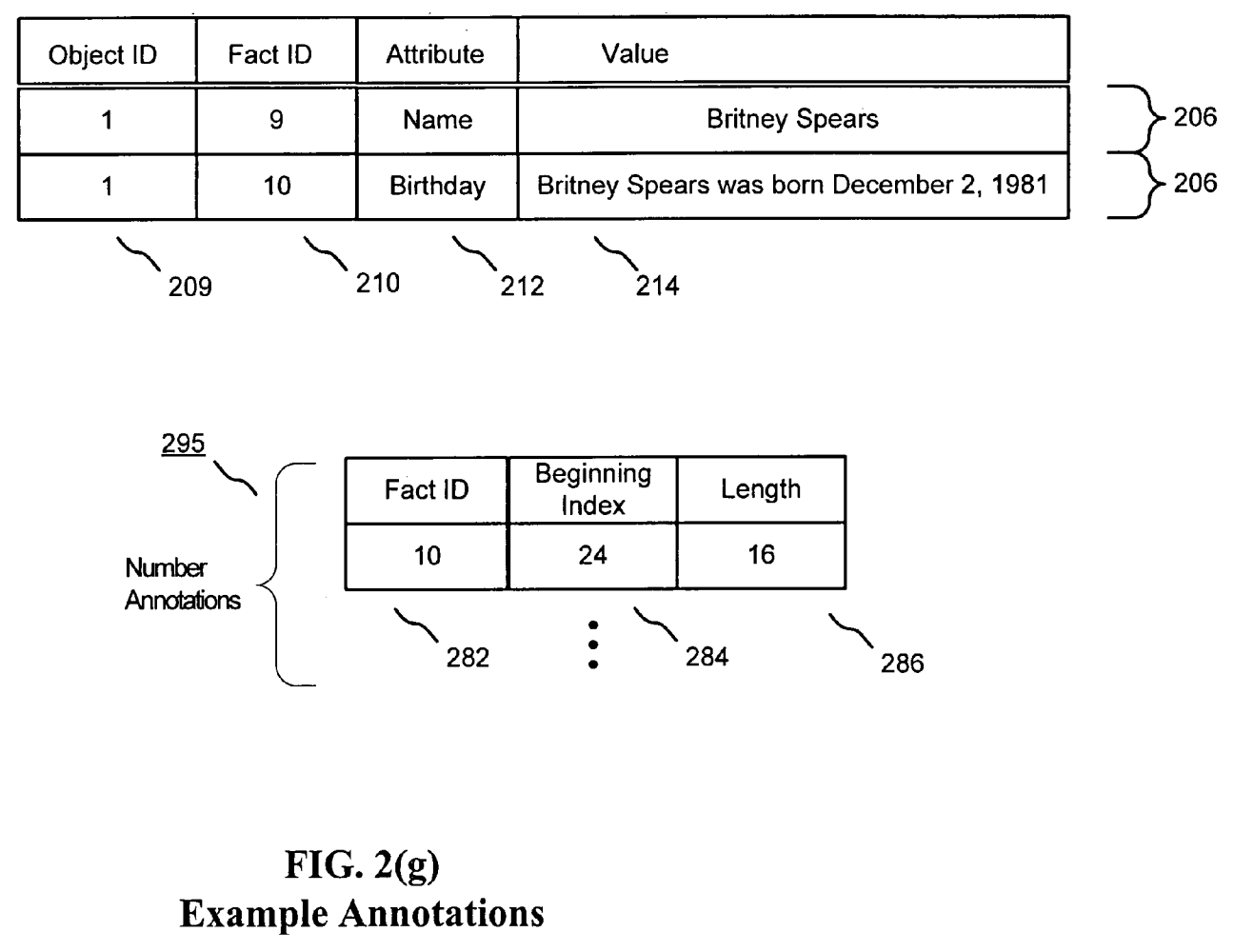

| Object ID | Fact ID | Attribute | Value |
|---|---|---|---|
| 1 | 9 | Name | Britney Spears |
| 1 | 10 | Birthday | Britney Spears was born December 2, 1981 |

209 210 212 214

206 206

| Fact ID | Beginning Index | Length |
|---|---|---|
| 10 | 24 | 16 |

282 284 286

295 Number Annotations

FIG. 2(g)
Example Annotations

```
href='http://google.com/ref/api/q=China'></link><generator version='1.0' uri='http://
google.com'>Google Reference Pages</generator><openSearch:totalResults>1039</
openSearch:totalResults><entry><id>http://google.com/ref/api/
1a27a12f0de4b506a93022496b370c40</id><link rel='self' type='application/atom+xml'
href='http://google.com/ref/api/1a27a12f0de4b506a93022496b370c40'></link>
<g:fact attribute='Name' value='China'><link href='http://www.cia.gov/cia/publications/factbook/
geos/ch.html'></link><link href='http://www.citypopulation.de/World.html'></link><link
href='http://www.infoplease.com/ipa/A0855603.html'></link></g:fact>
<g:fact attribute="Population" value="1306313812 (July 2005 est.)">
    <atom:link href="http://www.cia.gov" />
    <g:annotation begin="0" length="10">
        <g:number value="1306313812" />
    </g:annotation>
    <g:annotation begin="12" length="9">
        <g:date value="July 2005" />
    </g:annotation>
</g:fact>
<g:fact attribute="Diplomatic representation in the US (chancery)" value="2300 Connecticut
Avenue NW, Washington, District of Columbia, 20008">
    <atom:link href="http://www.cia.gov" />
    <g:annotation begin="0" length="4">
        <g:number value="2300" />
    </g:annotation>
    <g:annotation begin="61" length="6">
        <g:number value="20008" />
    </g:annotation>
    <g:annotation begin="28" length="39">
        <g:geoPt lat="38.936283" lon="-77.05994" />
    </g:annotation>
</g:fact>
</entry>
```

FIG. 6

ANNOTATION FRAMEWORK

CROSS-REFERENCE TO RELATED APPLICATIONS

This application is related to the following U.S. applications, all of which are incorporated by reference herein:

U.S. application Ser. No. 11/357,748, entitled "Support for Object Search", filed on Feb. 17, 2006, by Alex Kehlenbeck and Andrew W. Hogue;

U.S. application Ser. No. 11/342,290, entitled "Data Object Visualization", filed on Jan. 27, 2006, by Andrew W. Hogue, David Vespe, Alex Kehlenbeck, Mike Gordon, Jeffrey C. Reynar, David Alpert;

U.S. application Ser. No. 11/342,293, entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/356,679, entitled "Query Language", filed Feb. 17, 2006, by Andrew W. Hogue, Doug Rohde;

U.S. application Ser. No. 11/356,837, entitled "Automatic Object Reference Identification and Linking in a Browseable Fact Repository", filed on Feb. 17, 2006, by Andrew W. Hogue;

U.S. application Ser. No. 11/356,851, entitled "Browseable Fact Repository", filed concurrently herewith, on Feb. 17, 2006, by Andrew W. Hogue, Jonathan T. Betz;

U.S. application Ser. No. 11/356,842, entitled "ID Persistence Through Normalization", filed on Feb. 17, 2006, by Jonathan T. Betz, Andrew W. Hogue;

U.S. application Ser. No. 11/341,069, entitled "Object Categorization for Information Extraction", filed on Jan. 27, 2006, by Jonathan T. Betz;

U.S. application Ser. No. 11/356,838, entitled "Modular Architecture for Entity Normalization", filed on Feb. 17, 2006, by Jonathan T. Betz, Farhan Shamsi;

U.S. application Ser. No. 11/356,765, entitled "Attribute Entropy as a Signal in Object Normalization", filed on Feb. 17, 2006, by Jonathan T. Betz, Vivek Menezes;

U.S. application Ser. No. 11/341,907, entitled "Designating Data Objects for Analysis", filed on Jan. 27, 2006, by Andrew W. Hogue, David Vespe, Alex Kehlenbeck, Mike Gordon, Jeffrey C. Reynar, David Alpert;

U.S. application Ser. No. 11/342,277, entitled "Data Object Visualization Using Graphs", filed on Jan. 27, 2006, by Andrew W. Hogue, David Vespe, Alex Kehlenbeck, Mike Gordon, Jeffrey C. Reynar, David Alpert.

BACKGROUND OF THE INVENTION

1. Field of the Invention

This invention pertains in general to searching collections of data and, in particular, to ways of adding detecting information in such collections of data.

2. Description of the Related Art

The World Wide Web and other information storage and retrieval systems contain a great deal of information. People have devised many ways of organizing and viewing this information.

As the retrieval and storage of information on the Internet continues to evolve, information is being stored in many different formats besides web pages. Moreover, in a very large repository of data, it becomes difficult to search the data in real-time. What is needed are new and advanced ways of accessing large collections of data from diverse sources, such as the Internet.

SUMMARY OF THE INVENTION

The described embodiments of the present invention provide a methodology and system for storing annotations of facts stored in a repository in association with objects. The fact repository includes a large collection of facts, each of which is associated with an object, such as a person, place, book, movie, country, or any other entity of interest. Each fact comprises an attribute, which is descriptive of the type of fact (e.g., "name," or "population") and a value for that attribute (e.g., "George Washington", or "1,397,264,580"). A value can also contain any amount of text—from a single term or phrase to many paragraphs or pages—such as appropriate to describe the attribute. Each object will have a name fact that is the name of the object. The value can include one or more phrases that are themselves the names of other facts.

In one embodiment, annotations are stored corresponding to some of the facts in the repository. Some annotations, for example, represent number values in the facts, while other annotation values represent dates, geographic locations, isbn values, names, units, and so on.

Annotations are passed to requesting objects in response to queries and are used to determine search results. Annotations are also used to decide whether facts match and whether facts contain reasonable values.

BRIEF DESCRIPTION OF THE DRAWINGS

FIG. 2(g) shows an example of two facts and an associated annotation of one of the facts.

FIG. 6 shows an example of an XML feed sent in response to a request from on object requester and including annotations.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
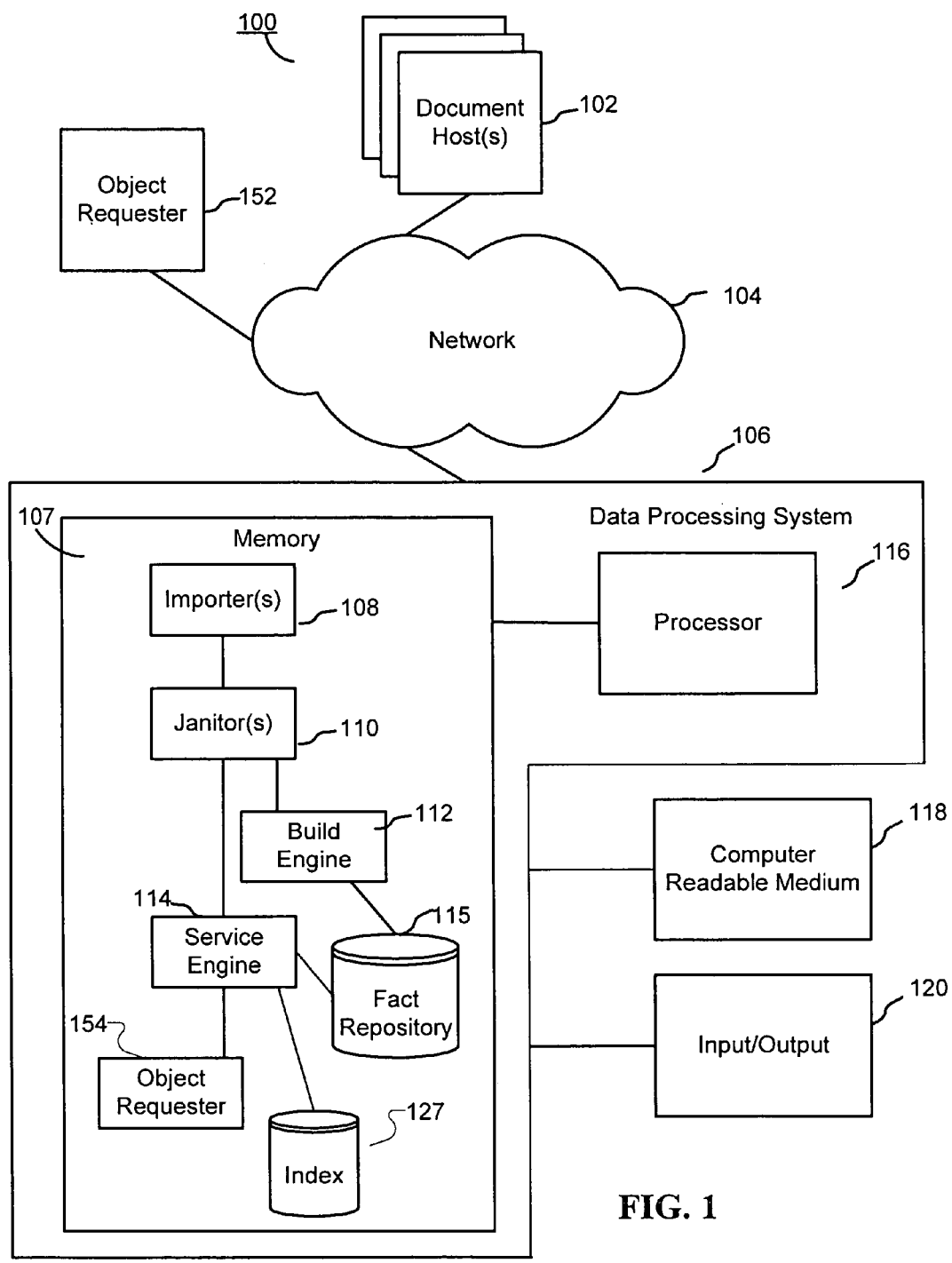
FIG. 1 shows a system architecture, in accordance with an embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears's birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(*a*)-2(*d*).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
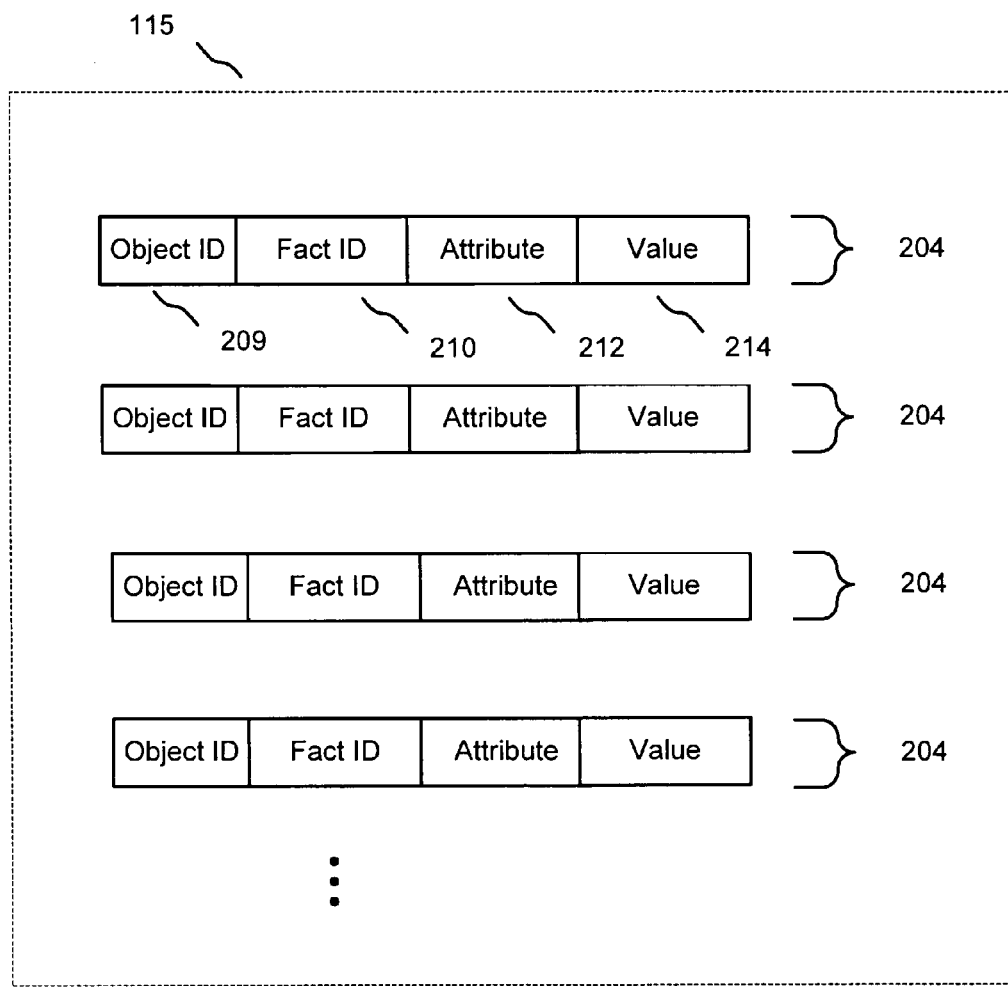
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
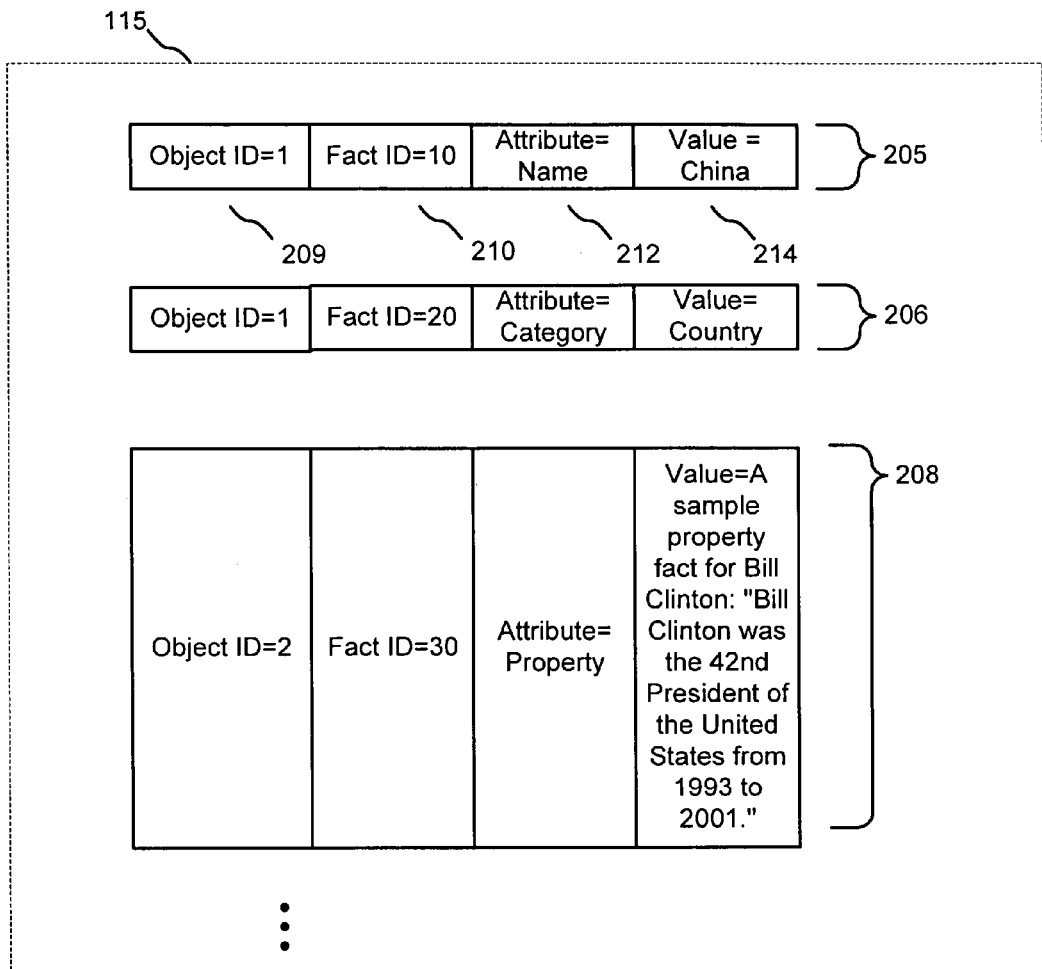

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
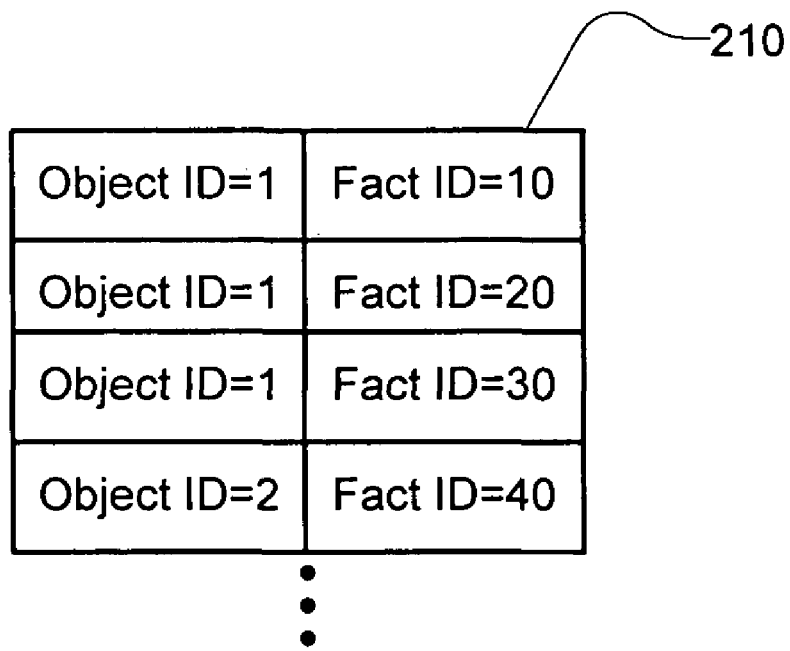

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
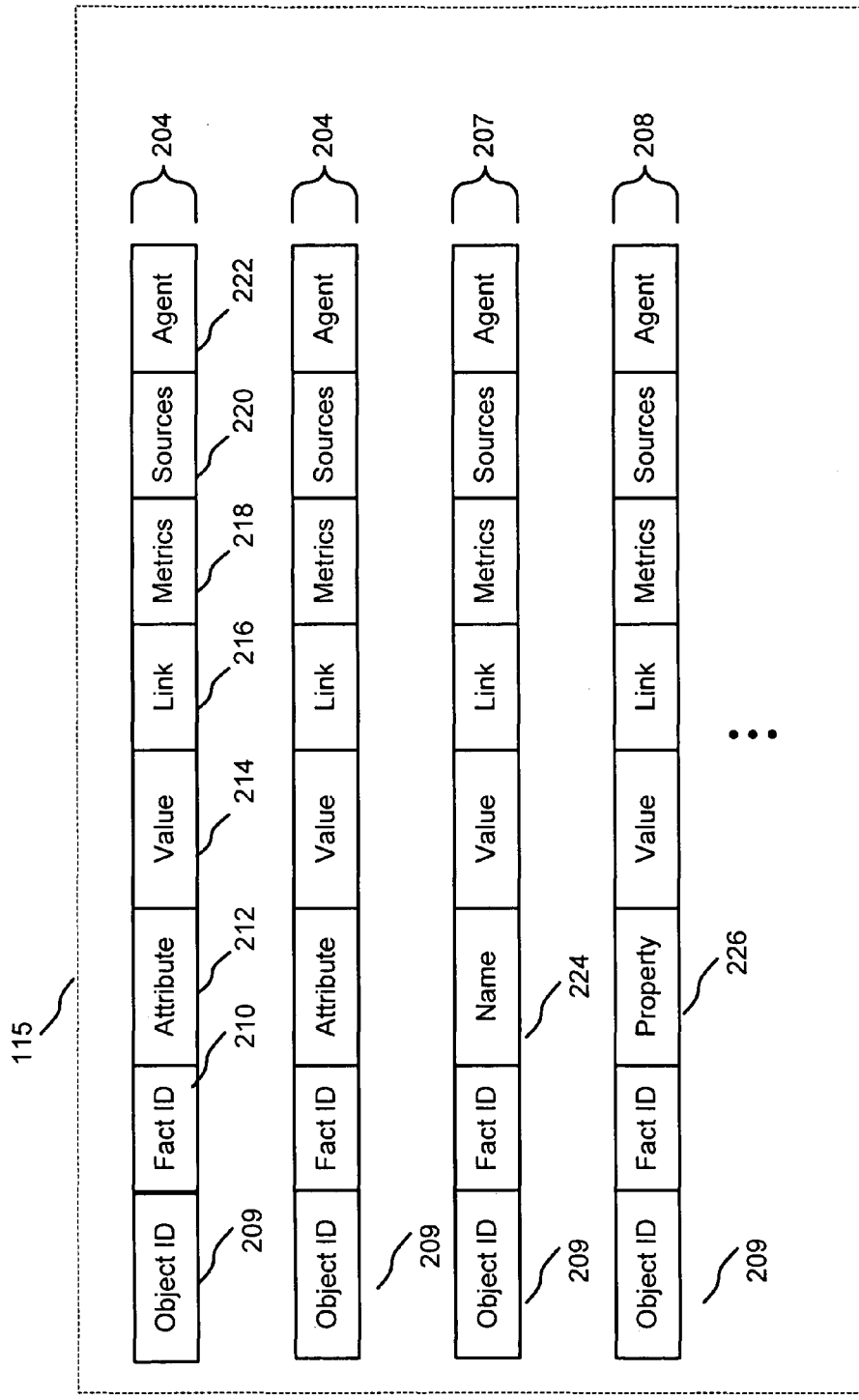
Figure 2E:
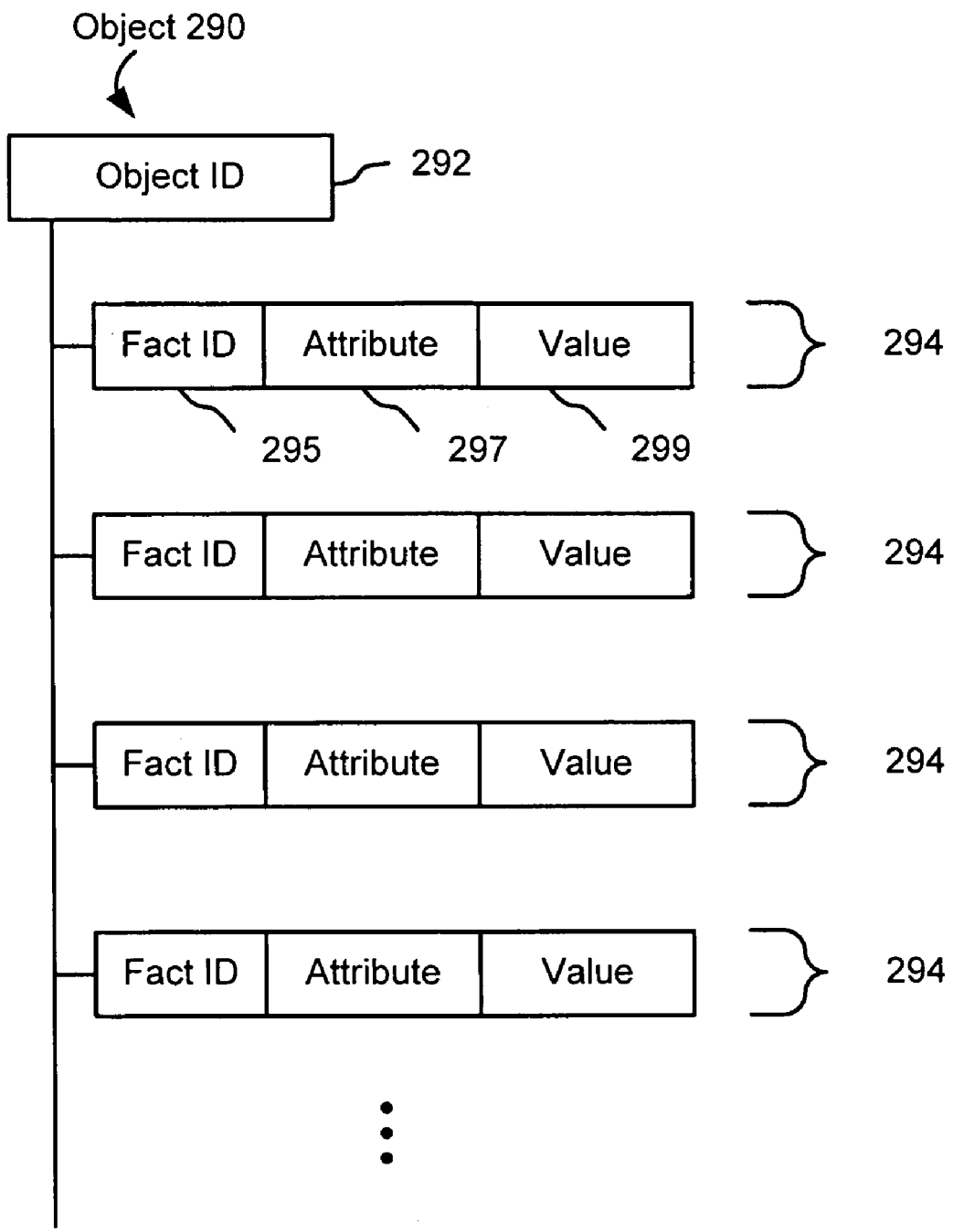
FIG. 2(e) is a block diagram illustrating an alternate data structure for facts and objects in accordance with preferred embodiments of the invention.
Figure 2F:
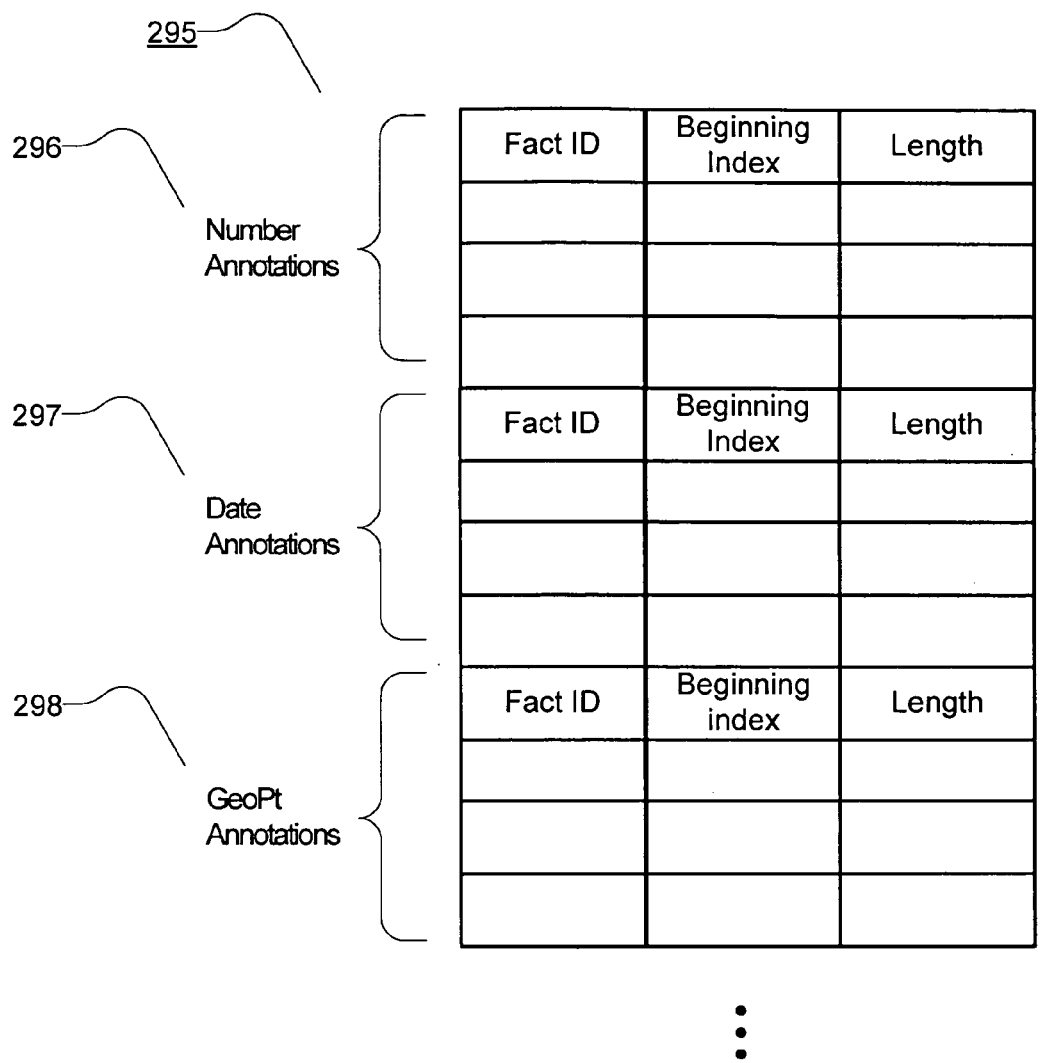
FIG. 2(f) shows a plurality of annotations associated with facts in a repository.

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(*a*)-2(*d*) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

FIG. 2(*e*) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Referring again to FIG. 1, the content of the facts in the repository 115 are also indexed in index 127. The index 127 maintains a term index, which maps terms to {object, fact, field, token} tuples, where "field" is, e.g., attribute or value. The service engine, 114 is adapted to receive keyword queries from clients such as object requesters, and communicates with the index 127 to retrieve the facts that are relevant to user's search query. For a generic query containing one or more terms, the service engine 114 assumes the scope is at the object level. Thus, any object with one or more of the query terms somewhere (not necessarily on the same fact) will match the query for purposes of being ranked in the search results.

In one embodiment the ranking (score) of an object is a linear combination of relevance scores for each of the facts. The relevance score for each fact is based on whether the fact includes one or more query terms (a hit) in, for example, one of the attribute, value, or source portion of the fact. Each hit is scored based on the frequency of the term that is hit, with more common terms getting lower scores, and rarer terms getting higher scores (e.g., using a TF-IDF based term weighting model). The fact score is then adjusted based on additional factors. These factors include the appearance of consecutive query terms in a fact, the appearance of consecutive query terms in a fact in the order in which they appear in the query, the appearance of an exact match for the entire query, the appearance of the query terms in the name fact (or other designated fact, e.g., property or category), and the percentage of facts of the object containing at least one query term. Each fact's score is also adjusted by its associated confidence measure and by its importance measure. Since each fact is independently scored, the facts most relevant and important to any individual query can be determined, and selected. In one embodiment, a selected number (e.g., 5) of the top scoring facts is selected for display in response to a query.

A user interface for browsing the fact repository 115 is discussed in co-pending U.S. application Ser. No. 11/356,851, entitled "Browsable Fact Repository" of Betz and Hogue, which is herein incorporated by reference.

In a preferred embodiment of the invention, facts can have associated "annotations." Annotations are subsets of snippets of the fact's value that are used to provide additional information about facts. Often, an annotation has a high confidence level, especially if it has been entered by a human being or somehow otherwise corroborated. For example, the string "New York, N.Y." can be used to generate a map plot, but an annotation can associate a latitude and longitude with that string and the latitude/longitude can be plotted on a map. As another example, the Britney Spears object has a large number of facts relating to Britney Spears. Annotations exist for such facts as her birthday, wedding anniversary, and birthplace. It is possible to compare annotations of various facts to determine whether a fact has reasonable values. Certain types of information such as numbers, dates, and locations are good candidates for becoming annotations, as discussed in detail below.

FIG. 2(*f*) shows a format of a plurality of annotations associated with facts in repository 115 in an embodiment of the invention. The Figure shows three types of annotations (although there can be other types of annotations): Number annotations 296, date annotations 297, and GeoPoint (GeoPt) annotations 298. Each annotation has at least a fact ID, a beginning index in the value of the fact with the fact ID, and a length within the value of the fact value. The fact ID identifies which fact the annotation is associated with. The beginning index is an index into the fact's value where the annotation value begins. The length is a length of the annotation value within the fact's value.

FIG. 2(*g*) shows an example of two facts and an associated annotation of one of the facts. As an example, if a fact 10 has a value of "Britney Spears was born Dec. 2, 1981" a date annotation associated with that fact might have the fact ID 282 of fact 10, an index of 284 (because the date starts on character 25, indexed from 1), and a length 286 of 16 (because the date is 16 characters long). (Other embodiments index from 0.)

In one embodiment, each type of fact is stored together (i.e., all the number facts together, etc). In other embodiments, annotation types are not necessarily stored together. In one embodiment, all fact values, including numeric values dates, latitude and longitude are stored in repository 115 as characters. Some embodiments also store a copy of the annotation value (for example "Dec. 2, 1981") with the annotation. Other embodiments store a pointer or reference into the appropriate fact to retrieve the annotation value. Other embodiments store the annotations as part of the facts instead of separately. Some embodiments index annotations in index 127, causing them to be searchable.

Figure 3A:
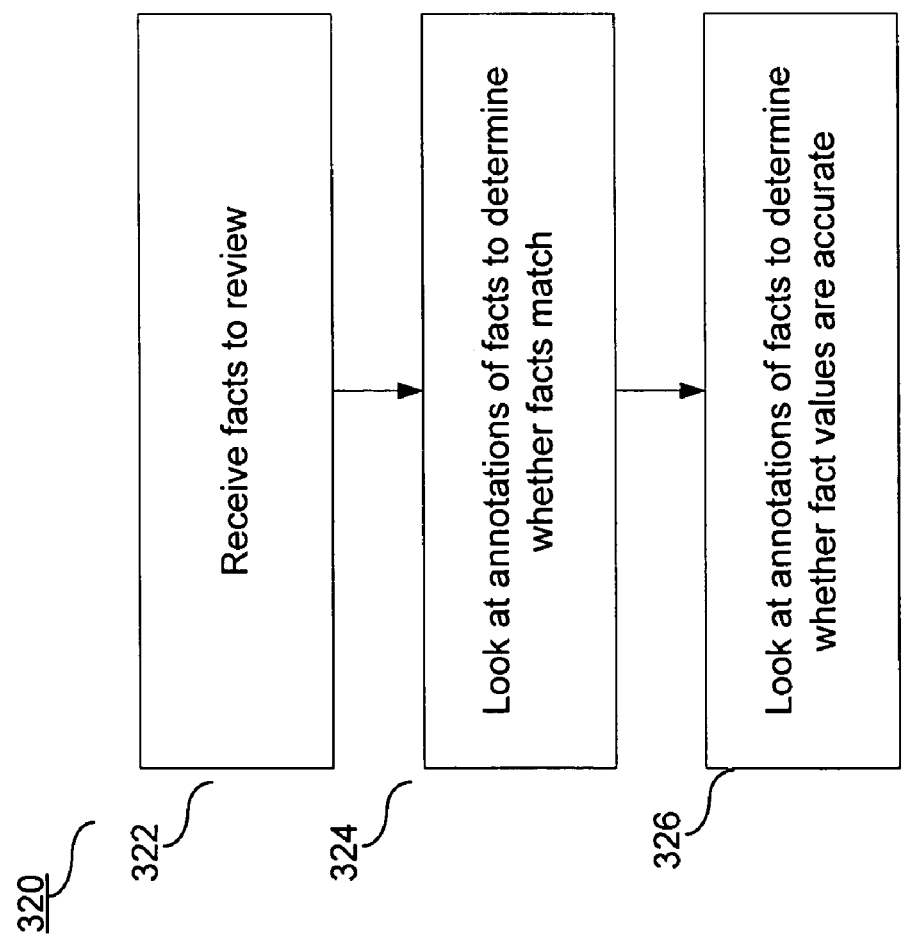
FIGS. 3(a)-3(c) are flow charts showing methods of creating and using annotations.
Figures 3B, 3C:
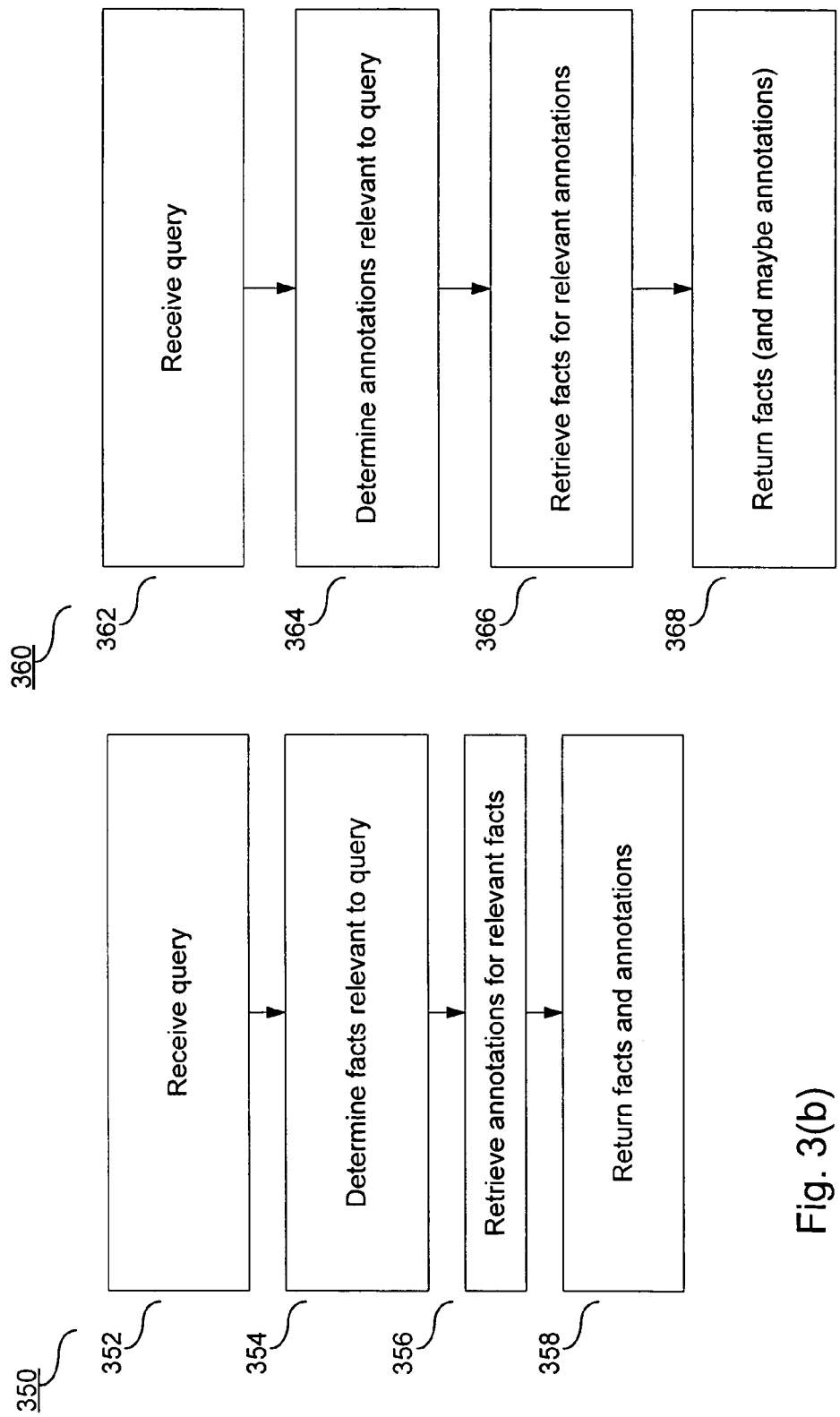

As shown in FIG. 3(*a*), annotations can be used when "vetting" facts stored in repository 115. Such an operation might be performed by janitor 110 or by any appropriate entity. For a fact received for review in step 322, janitor 110 determines 324 whether the fact is duplicated by other facts in the repository. For example, two facts may contain the same information in different formats. For example, a plurality of facts might have annotations that indicate or suggest that string values of "10 million", "10,000,000", and "10000000.000" all represent the same value. As another example, a first fact may contain a distance value in metric format, while a second fact might contain the same distance in Imperial format. In some embodiments, comparison of annotations alone is sufficient to determine duplicates. In other embodiments, comparison of annotations is an initial step and janitors 110 can go on to make more accurate comparisons using the candidates identified by annotations. Thus, annotations can also be used as an initial screening device to find duplicate facts.

For a given fact received in step 324, janitor 110 can also use annotations to determine 326 whether the fact has a reasonable value. For example, if there exists an annotation for Britney Spears's birthplace stating that it is "Louisiana", then janitor 110 may use that information to vet the large numbers of facts associated with the Britney Spears object. The Britney Spears's birthplace annotation may have been automatically generated or it may have been hand-entered and vetted by a human being (the latter presumably being more trustworthy). For example, because Louisiana is abbreviated as "LA," some facts associated with the Britney Spears object may mistakenly contain the value that Britney Spears was born in Los Angeles, which also is sometimes abbreviated as "LA." Janitor 110 can determine that the facts with a birthplace of Los Angeles" do not match the annotation and choose to remove (or not to store) those facts from the repository 115.

Similarly, the service engine can use annotations to determine which facts to send in response to a query. Facts having values in accordance with corresponding annotation values are given preference.

FIGS. 3(*b*) and 3(*c*) are flow charts showing additional methods of using annotations. FIG. 3(*b*) shows an method where a query is received 352 (for example by object service 114). The object service determines 354 a plurality of facts that match the query. Then the object service determines 356 one or more facts that correspond to the determined facts and returns 358 the facts and the annotations. Thus, if the query is "Britney Spears" object service 114 would determine that the facts of FIG. 2(*g*) match and would also determine that the annotation of FIG. 2(*g*) matches since it corresponds to facts that match the query. In this method, annotations are returned in addition to facts because they provide a fast way to locate pertinent data in the facts without a real-time search of the fact values.

FIG. 3(*c*) is a flow chart showing use of annotations to help select facts. A query is received 362 (for example by object service 114). The object service determines 366 a plurality of annotations that are relevant to the query. Relevance of annotations can be determined, for example, by accessing the index 127 if annotations are indexed, by accessing a separate annotation index (not shown) if annotations are separately indexed, by searching the values of the annotations, or by any other appropriate method. Then the object service determines 366 one or more facts that correspond to the determined annotations and returns 368 the facts. In some embodiments, the annotations are also returned. Thus, if the query is "Britney Spears's birthday" object service 114 would determine that the annotation of FIG. 2(*g*) matches and would also determine that fact 10 is associated with that annotation. Some embodiments would return only fact 10. Other embodiments would return fact 10 and other facts of the "Britney Spears" object that is associated with fact 10. Some embodiments may also return the annotation itself. In this method, annotations are used because they provide a fast way to locate pertinent data in the facts without a real-time search through the fact values.

Annotations can also be used by service engine 114 to identify erroneous facts that do not match annotation values.

Figure 4:
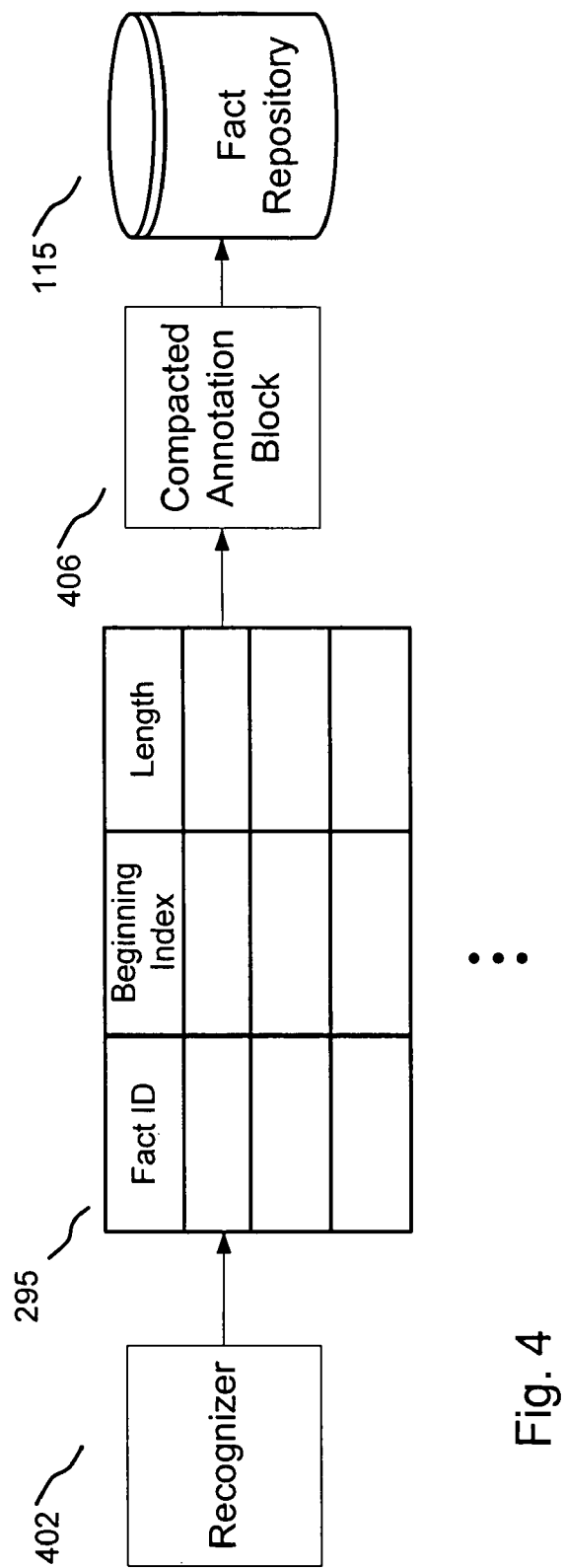
FIG. 4 is a block diagram showing annotation creation.
Figure 5:
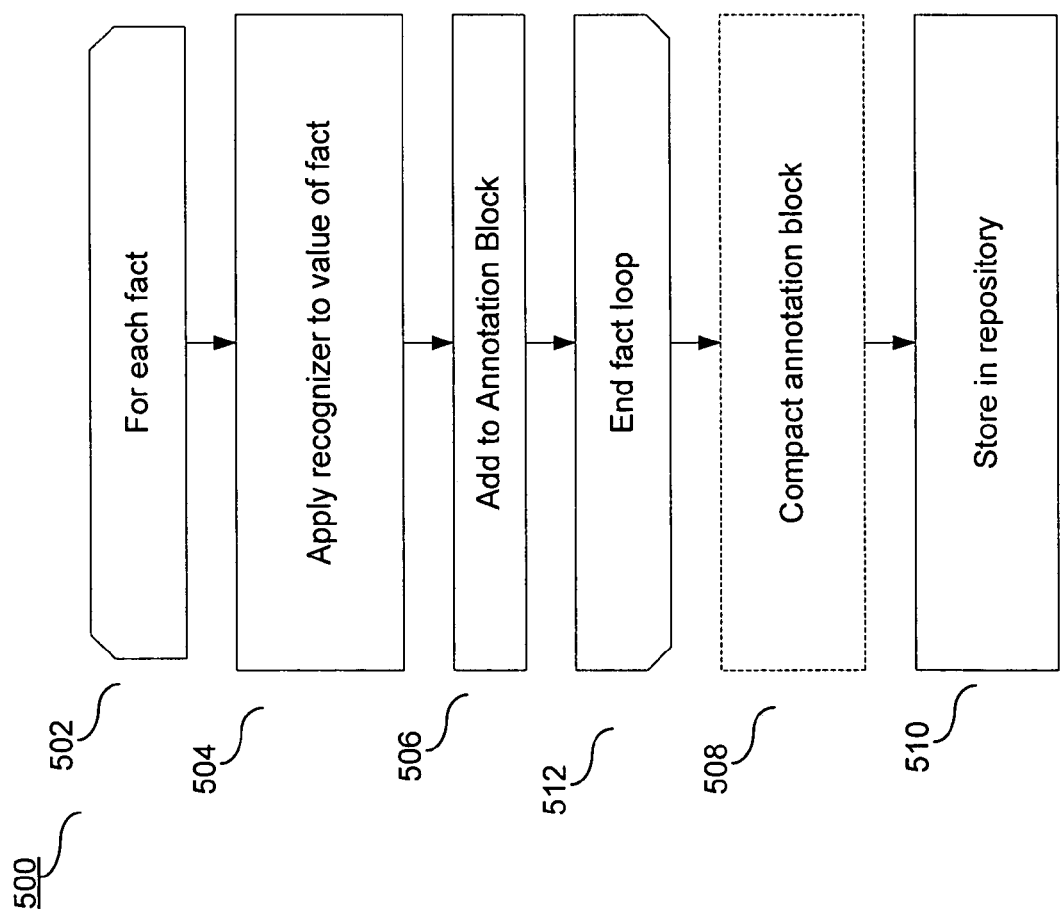
FIG. 5 is a flow chart showing annotation creation.

FIG. 4 is a block diagram showing one method of annotation creation. FIG. 5 is a flow chart showing annotation creation.

A recognizer 402 is preferably implemented as a software program or hardware device. It examines 504 facts in repository 115 to extract annotation values. Recognizers may recognize, for example, dates, numbers, locations (which are used to create GeoPt annotations), distances, directions, isbn numbers, names of persons, measurements, height, weight, mass, volume, and so on. As another example, measurements can be annotated to include units such as "10 meters", "100 degrees Fahrenheit, and so on. Extracted annotations are encoded in one or more appropriately sized annotation blocks 506 as shown in FIG. 2(*f*) with a fact ID, index, and length. In some embodiments, the annotation blocks are compacted 508 before being stored 510 in repository 115 or other appropriate storage. In other embodiments, annotations are added by human beings. In other embodiments, some annotations are added by human beings and some are automatically generated. In some embodiments, annotations added by human beings are given a higher confidence value than annotations that are automatically created.

As discussed above, annotations can be returned in response to a query. This query can be, for example, a browser-based query, in which case, the annotations are returned with the query results. The annotations can be mixed in with the query results or can be displayed separately. For example, annotations can be displayed separately at the top of a results web page.

Queries can also take the form of requests for XML feeds or other formats of data feeds. FIG. 6 shows an example of an partial entry 600 in an XML feed 306 sent in response to a request from object requester 152 (for example, the request: http://google.com/ref/api/q=china). This example is presented partly to show examples of some kinds of annotations and their values.

In the example, an entry corresponds to an object and each atom corresponds to a fact in the object. An object can have more than one associated fact. This example uses the Atom format, although any appropriate feed format can be used.

In the described embodiment, each object has an associated object ID 601 (in this example "1a27a12f0de4b506a93022496b370c40"). The feed includes a plurality of facts 602, 604, 606. Fact 602 shows an example of a fact having an attribute and an attribute value, along with a link representing a source of the fact.

Note that, in certain embodiments, for facts associated with an object to be returned in response to a query, only one fact needs to match the query. Thus, in the example, the q parameter is "q=China". Fact 602 has a fact with a value containing the string "China". Facts 604 and 606 do not contain the query string "China," but are returned because they are facts associated with the same object as fact 602.

Some embodiments return partial facts as well as or in addition to complete facts. For example, a query for the date of birth attribute for object number 2038472038 might just return "Jun. 17, 1974" and no other facts for that object.

Fact 604 also includes an attribute and a value, and further includes an annotation. In one embodiment, an annotation is associated with a fact in repository 115.

In FIG. 6, the feed for fact 604 has an attribute and a value: attribute="Population" value="1306313812 (July 2005 est.)"

The feed for fact 604 also has a source link:
<atom:link href="http://www.cia.gov"/>
The feed for fact 604 also has two associated annotations:

```
<g:annotation begin="0" length="10">
<g:number value="1306313812" />
</g:annotation>
<g:annotation begin="12" length="9">
<g:date value="July 2005" />
</g:annotation>
```

In this embodiment, each annotation has a beginning index, a length, and a value. One of the annotations is a number annotation with a value of "1306313812". The other annotation is a date annotation with a value of "July 2005". In some embodiments, a date annotation has separate fields for month, day, and year.

In the feed for fact 606 has an associated geopoint annotation:

```
</g:annotation>
<g:annotation begin="28" length="39">
<g:geoPt lat="38.936283" lon="-77.05994" />
</g:annotation>
```

A geopoint annotation represents a latitude and longitude associated with a fact. Geopoint annotations are noteworthy at least because they contain a two-part value (latitude and longitude). Other types of annotations can have two-or-more-part values as well. Note that in this example, the latitude and longitude values themselves do not appear in the fact. Instead, the value "Washington, D.C., 20008" appears. At some point, an annotation was created for the latitude and longitude of Washington, D.C. and stored in association with that fact (and most likely with all other facts containing a mention of "Washington, D.C.").

It will be understood that other types of annotations can be used in the present invention, including but not limited to: name annotations, isbn annotations, units (to indicate a unit for numerical values).

As discussed above, the feed received by an object requester can be used in a number of ways, including but not limited to display and calculation.

Some embodiments also support an "alt" parameter, which allows the user to specify the format of the results. It has three possible values: "atom" (the default), "rss", "osrss".

EXAMPLES

/alt=atom/q=albert+einstein
results for the query "albert einstein" returned in Atom format
/alt=rss/q=albert+einstein
results for the query "albert einstein" returned in RSS format
/alt=osrss/q=albert+einstein
results for the query "albert einstein" returned in OpenSearch format
The Alt Parameter can be Combined with the Various Other Parameters:
/max-facts=5/alt=rss/max-sources=4/q=albert+einstein-?start-index=10
five facts per object, four sources per fact, starting at the 10th result, in RSS format The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of querying a fact repository, performed at a computer system having one or more processors and memory storing one or more programs for execution by the one or more processors, the method comprising:

receiving a search query;

retrieving at least one fact from the fact repository, the at least one fact corresponding to the received search query and having an attribute and a value, wherein the fact repository includes a plurality of facts associated with objects, wherein a respective fact in the fact repository includes a respective attribute and a respective value, wherein the respective value is a text string, and wherein the plurality of facts are extracted from a plurality of documents;

retrieving at least one annotation associated with the at least one fact, the at least one annotation having a value corresponding to the value of the at least one fact, wherein an annotation includes additional information about a fact, and wherein a value of the annotation is indexed to a substring of a fact's value;

sending the attribute and value of the retrieved fact in response to the query; and sending the retrieved annotation in response to the query.

2. The method of claim 1, wherein the search query is a request for facts associated with a particular object.

3. The method of claim 1, wherein the search query is a query that can be matched by attributes or values of facts in the fact repository.

4. The method of claim 1, wherein the annotation is retrieved before the at least one fact and the fact is retrieved in accordance with the annotation.

5. The method of claim 1, wherein the at least one fact is retrieved before the annotation and the annotation is retrieved in accordance with the fact.

6. The method of claim 1, wherein the annotation has a value that is contained in the value of the at least one fact.

7. The method of claim 1, wherein the annotation has a value that is based on the value of the at least one fact, but is not contained in the value of the at least one fact.

8. The method of claim 1, wherein each fact has no more than one annotation.

9. The method of claim 1, wherein each fact can have any number of annotations.

10. The method of claim 1, wherein the annotation is a Number annotation.

11. The method of claim 1, wherein the annotation is a Date annotation.

12. The method of claim 1, wherein the annotation is a GeoPoint annotation.

13. The method of claim 12, wherein the GeoPoint annotation is based on a place name in the fact's value and the GeoPoint annotation has a latitude value and a longitude value.

14. The method of claim 1, wherein the annotation has a plurality of values associated with it.

15. The method of claim 1, further comprising returning facts corresponding to the annotations in response to the query.

16. The method of claim 1, wherein the facts are extracted from the plurality of documents without user interaction.

17. A system to allow a user to search a fact repository, comprising:
- one or more processors; and
- memory storing one or more programs for execution by the one or more processors, the one or more programs comprising instructions to:
  - receive a search query from an object requester;
  - retrieve at least one fact from a fact repository, the at least one fact corresponding to the received search query and having an attribute and a value, wherein the fact repository includes a plurality of facts associated with objects, wherein a respective fact in the fact repository includes a respective attribute and a respective value, wherein the respective value is a text string and wherein the plurality of facts are extracted from a plurality of documents;
  - retrieve at least one annotation associated with the at least one fact, the annotation having a value corresponding to the value of the at least one fact, wherein an annotation includes additional information about a fact, and wherein a value of the annotation is indexed to a substring of a fact's value;
  - send the attribute and value of the at least one fact and the annotation in response to the query; and
  - send the retrieved annotation in response to the query.

18. The system of claim 17, wherein the annotation is a Number annotation.

19. The system of claim 17, wherein the annotation is a Date annotation.

20. The system of claim 17, wherein the annotation is a GeoPoint annotation.

21. The system of claim 20, wherein the GeoPoint annotation is based on a place name in the fact's value and the GeoPoint annotation has a latitude value and a longitude value.

22. The system of claim 17, wherein the facts are extracted from the plurality of documents without user interaction.

23. A computer implemented method of querying a fact repository, the method performed by an object requester device and comprising:
- sending a search query from the object requester device to a fact repository, wherein the fact repository includes a plurality of facts associated with objects, wherein a respective fact in the fact repository includes a respective attribute and a respective value, wherein the respective value is a text string, and wherein the plurality of facts are extracted from a plurality of documents; and
- receiving a query result having at least one fact from the fact repository, the query result having: at least one fact corresponding to the received search query, and an annotation corresponding to the value of the at least one fact, wherein the annotation includes additional information about a fact, and wherein a value of the annotation is indexed to a substring of a fact's value.

24. The method of claim 23, further comprising sending the annotation associated with the fact, the annotation having a portion of the fact's value therein.

25. The method of claim 23, wherein the annotations are sent after the attribute and value of the at least one fact.

26. The method of claim 23, wherein the facts are extracted from the plurality of documents without user interaction.

27. A computer implemented method of responding to a search query made to a fact repository, performed at a computer system having one or more processors and memory storing one or more programs for execution by the one or more processors, the method comprising:
- receiving the search query;
- retrieving an annotation value that matches at least a part of the query, wherein an annotation includes additional information about a fact, and wherein the annotation value is indexed to a substring of a fact's value;
- retrieving at least one fact from the fact repository, the at least one fact corresponding to the received search query and having an attribute and a value, wherein the fact repository includes a plurality of facts associated with objects, wherein a respective fact in the fact repository includes a respective attribute and a respective value, wherein the respective value is a text string, and wherein the plurality of facts are extracted from a plurality of documents;
- determining whether the at least one fact's value corresponds to the annotation value; and
- sending the at least one fact in response to the query in accordance with a determination that the at least one fact's value corresponds to the annotation value.

28. The method of claim 27, further comprising returning the retrieved annotation value in response to the query.

29. The method of claim 27, wherein the facts are extracted from the plurality of documents without user interaction.

30. A computer implemented method of responding to a search query made to a fact repository, performed at a computer system having one or more processors and memory storing one or more programs for execution by the one or more processors, the method comprising:
- receiving the search query; and
- in response to receiving the search query, returning annotations corresponding to the search query from annotations for a plurality of snippets of facts in the fact repository, wherein the fact repository includes a plurality of facts associated with objects, wherein a respective fact in the fact repository includes a respective attribute and a respective value, wherein the respective value is a text string, and wherein the plurality of facts are extracted from a plurality of documents, wherein an annotation includes additional information about a fact, and wherein a value of the annotation is indexed to a substring of a fact's value.

31. The method of claim 30, wherein the facts are extracted from the plurality of documents without user interaction.

32. A computer implemented method of querying a fact repository, performed at a computer system having one or more processors and memory storing one or more programs for execution by the one or more processors, the method comprising:
- receiving a search query;
- retrieving at least one fact from the fact repository, the at least one fact corresponding to the received search query and having an attribute and a value, wherein the fact repository includes a plurality of facts associated with objects, wherein a respective fact in the fact repository includes a respective attribute and a respective value, wherein the respective value is a text string, and wherein the plurality of facts are extracted from a plurality of documents;
- retrieving at least one annotation associated with the at least one fact, the at least one annotation having a value corresponding to the value of the at least one fact, wherein an annotation includes additional information about a fact, and wherein a value of the annotation is indexed to a substring of a fact's value; and sending the attribute and value of the retrieved fact and the retrieved annotation in response to the query.

33. The method of claim 32, wherein the search query is a request for facts associated with a particular object.

34. The method of claim 32, wherein the search query is a query that can be matched by attributes or values of facts in the fact repository.

35. The method of claim 32, wherein the annotation is retrieved before the at least one fact and the at least one fact is retrieved in accordance with the annotation.

36. The method of claim 32, wherein the at least one fact is retrieved before the annotation and the annotation is retrieved in accordance with the fact.

37. The method of claim 32, wherein the annotation has a value that is contained in the value of the at least one fact.

38. The method of claim 32, wherein the annotation has a value that is based on the value of the at least one fact, but is not contained in the value of the at least one fact.

39. The method of claim 32, wherein each fact has no more than one annotation.

40. The method of claim 32, wherein each fact is configured to have any number of annotations.

41. The method of claim 32, wherein the annotation is a Number annotation.

42. The method of claim 32, wherein the annotation is a Date annotation.

43. The method of claim 32, wherein the annotation is a GeoPoint annotation.

44. The method of claim 43, wherein the GeoPoint annotation is based on a place name in the fact's value and the GeoPoint annotation has a latitude value and a longitude value.

45. A computer system, comprising:
one or more processors; and
memory storing one or more programs for execution by the one or more processors, the one or more programs including instructions for:
receiving a search query;
retrieving at least one fact from a fact repository, the at least one fact corresponding to the received search query and having an attribute and a value, wherein the fact repository includes a plurality of facts associated with objects, wherein a respective fact in the fact repository includes a respective attribute and a respective value, wherein the respective value is a text string, and wherein the plurality of facts are extracted from a plurality of documents;
retrieving at least one annotation associated with the at least one fact, the at least one annotation having a value corresponding to the value of the at least one fact, wherein an annotation includes additional information about a fact, and wherein a value of the annotation is indexed to a substring of a fact's value; and
sending the attribute and value of the retrieved fact and the retrieved annotation in response to the query.

46. The system of claim 45, wherein the annotation is a GeoPoint annotation.

47. The system of claim 46, wherein the GeoPoint annotation is based on a place name in the fact's value and the GeoPoint annotation has a latitude value and a longitude value.

48. A non-transitory computer readable storage medium, storing one or more programs for querying a fact repository, for execution by one or more processors of a computer system, the one or more programs including instructions for:
receiving a search query;
retrieving at least one fact from the fact repository, the at least one fact corresponding to the received search query and having an attribute and a value, wherein the fact repository includes a plurality of facts associated with objects, wherein a respective fact in the fact repository includes a respective attribute and a respective value, wherein the respective value is a text string, and wherein the plurality of facts are extracted from a plurality of documents;
retrieving at least one annotation associated with the at least one fact, the at least one annotation having a value corresponding to the value of the at least one fact, wherein an annotation includes additional information about a fact, and wherein a value of the annotation is indexed to a substring of a fact's value; and
sending the attribute and value of the retrieved fact and the retrieved annotation in response to the query.

49. The computer readable storage medium of claim 48, wherein the annotation is a GeoPoint annotation.

50. The computer readable storage medium of claim 49, wherein the GeoPoint annotation is based on a place name in the fact's value and the GeoPoint annotation has a latitude value and a longitude value.

51. A computer system, comprising:
one or more processors; and
memory storing one or more programs for execution by the one or more processors, the one or more programs including instructions for:
receiving a search query; and
in response to receiving the search query, returning annotations corresponding to the search query from annotations for a plurality of snippets of facts in the fact repository, wherein the fact repository includes a plurality of facts associated with objects, wherein a respective fact in the fact repository includes a respective attribute and a respective value, wherein the respective value is a text string, and wherein the plurality of facts are extracted from a plurality of documents, wherein an annotation includes additional information about a fact, and wherein a value of the annotation is indexed to a substring of a fact's value.

52. The system of claim 51, wherein the annotation is a GeoPoint annotation.

* * * * *